United States Patent [19]

Moore et al.

[11] 4,151,141

[45] Apr. 24, 1979

[54] PROCESS FOR CONTINUOUSLY REMOVING VOLATILE ORGANIC MATERIAL FROM AQUEOUS DISPERSIONS OF SYNTHETIC POLYMERS

[75] Inventors: Eugene R. Moore; Thomas K. Christianson; Ronald L. Wence, all of Midland, Mich.

[73] Assignee: The Dow Chemical Company, Midland, Mich.

[21] Appl. No.: 851,910

[22] Filed: Nov. 16, 1977

[51] Int. Cl.$^2$ .............................................. C08L 27/06
[52] U.S. Cl. ........................ 260/29.6 R; 260/29.6 PT
[58] Field of Search .................... 260/29.6 R, 29.6 PT

[56] References Cited

U.S. PATENT DOCUMENTS

| | | | |
|---|---|---|---|
| 3,663,632 | 5/1972 | Takeya et al. | 260/654 S |
| 3,930,931 | 1/1976 | Baughman et al. | 159/4 ST |
| 3,980,529 | 9/1976 | Wilhelm et al. | 203/89 |
| 4,007,022 | 2/1977 | Schleicher et al. | 55/41 |
| 4,017,445 | 4/1977 | Grosse-Wortmann et al. | 260/29.6 R |
| 4,020,032 | 4/1977 | Kalka et al. | 260/29.6 R |
| 4,031,056 | 6/1977 | Patel et al. | 260/29.6 PT |
| 4,032,497 | 6/1977 | Kidoh et al. | 260/29.6 R |

FOREIGN PATENT DOCUMENTS

| | | |
|---|---|---|
| 74120994 | 4/1976 | Japan. |
| 51-135989 | 11/1976 | Japan. |
| 7605121 | 11/1976 | Netherlands. |

*Primary Examiner*—M. J. Welsh
*Attorney, Agent, or Firm*—Thomas R. Wills

[57] ABSTRACT

Volatile organic materials are continuously removed from aqueous dispersions of synthetic polymers by flowing a dispersion stream into a zone having a vapor space above the liquid level of the stream while maintaining the pressure within the zone at about the vapor pressure of water at the temperature of the stream, and while maintaining the liquid level of the stream at a depth sufficiently shallow to promote substantially uniform and complete boiling throughout. The process is especially useful for removing residual monomers, such as vinyl chloride and vinylidene chloride, from a latex obtained from an emulsion polymerization reaction.

4 Claims, No Drawings

PROCESS FOR CONTINUOUSLY REMOVING VOLATILE ORGANIC MATERIAL FROM AQUEOUS DISPERSIONS OF SYNTHETIC POLYMERS

BACKGROUND OF THE INVENTION

The present invention pertains to a method for continuously removing volatile organic material from an aqueous dispersion of synthetic polymers. In particular, it is directed to a method for continuously removing residual monomers from a latex obtained from an emulsion polymerization reaction.

The production of a synthetic polymer may be conventionally carried out by polymerizing the constituent monomer or monomers thereof using an aqueous emulsion, suspension, or microsuspension process. The resulting product, being in the form of an aqueous latex or slurry, i.e., an aqueous dispersion, invariably contains a significant quantity of residual monomer and other non-monomeric impurities, such as organic solvents and the like. In many instances, it is desirable to remove substantially all of the residual monomer in the dispersion, especially in those cases where the quality of the polymer is thereby improved, where the monomer merits recovery for further use, and/or where the presence of even small quantities of residual monomer in the polymeric product would create problems in handling and use due to toxicological hazards. In cases where the monomer is a low boiling liquid, e.g., vinyl chloride and vinylidene chloride, and the polymerization has been carried out under autogenous pressure, much of the residual monomer remaining in the reaction vessel at the end of polymerization can be removed by simply venting the vessel. Nevertheless, the resulting dispersion will still contain an appreciable amount of residual monomer.

Conventionally, residual monomers have been removed from an aqueous dispersion after emulsion or suspension polymerization by heating and/or reducing the pressure within the reaction vessel. However, this method alone is not acceptable for larger and deeper reaction vessels, as the depth of the dispersion will prevent uniform monomer escape due to the difference in hydrostatic pressure between the top and bottom of the vessel. Accordingly, it has been suggested to agitate or circulate the dispersion within the reaction vessel in order to overcome these difficulties. Even with these improvements, however, monomer removal takes an extended and uneconomical period of time. Furthermore, when some polymers, e.g., polyvinyl chloride and polymers of vinylidene chloride, such as polyvinylidene chloride, are subjected to high temperatures for even short periods of time, the quality of the product is severely reduced.

It is also known to remove residual monomers by contacting an aqueous dispersion with a hot inert gas, such as nitrogen, or vapor, such as steam. The efficiency of such a process may be improved by operating at an elevated temperature and under a reduced pressure. Such a process, however, involves large quantities of gas which causes foaming problems and requires uneconomically long treating periods. Furthermore, the process is generally unacceptable for treating polymer latices, especially when performed as a batch operation, since localized hot spots caused by the gas bubbles, as well as prolonged exposure to high temperatures, will impair the stability of the latex and cause problems with coagulation and degradation of the polymer. It has been suggested that some of these problems could be overcome, by using a continuous process, which would reduce the period during which the latex is in contact with the hot gas. Such a modification does not, however, alleviate the problem of post-treating the increased volume of vapor liberated by such a gas stripping process in order to recover the volatilized organic material. In addition, it has generally been suggested that this continuous process be carried out by passing a dispersion mixed with the hot gas into an evacuated chamber in a finely dispersed form, e.g., in the form of droplets or fine streams. Such a modification, though operable when treating a slurry formed from suspension polymerization, is not acceptable for many polymer latices, since the shearing forces that arise from forming droplets or fine streams would cause coagulation problems.

Accordingly, it would be desirable to have a process for removing volatile organic material from an aqueous dispersion of synthetic polymers which would not require prolonged exposure of the dispersion to elevated temperatures, the addition of steam or other gasses, or subjecting the dispersion to the shearing forces of nozzles and the like. Additionally, it would be desirable to have a process which could be operated at low temperatures without creating excessive foaming problems, and which would remove volatile organic material in a very short time. Specifically, it would be desirable to have a process suitable for removing residual monomers from an aqueous synthetic polymer latex obtained from an emulsion polymerization reaction.

SUMMARY OF THE INVENTION

The present invention provides a process for continuously removing volatile organic material having a boiling point lower than or equal to that of water from an aqueous dispersion of synthetic polymers which process comprises flowing a stream of the dispersion into a zone having a vapor space above the liquid level of the stream, wherein the pressure within the zone is maintained at about the vapor pressure of water at the temperature of the stream, while maintaining the liquid level of the stream at a depth sufficiently shallow to promote substantially uniform and complete boiling throughout, and thereafter removing the volatilized material and recovering the treated dispersion.

In a specific embodiment, the present invention provides a process for continuously removing residual monomer having a boiling point lower than or equal to that of water from a synthetic polymer latex obtained from an emulsion polymerization reaction which comprises flowing a stream of the latex into a zone having a vapor space above the liquid of the stream, wherein the pressure within the zone is maintained at about the vapor pressure of water at the temperature of the stream while maintaining the liquid level of the stream at a depth sufficiently shallow to promote substantially uniform and complete boiling throughout, and thereafter removing the volatilized monomers and recovering the treated latex.

The present process is especially useful for removing those monomers and other organic non-monomeric materials which have a boiling point less than or equal to water, such as vinyl chloride and vinylidene chloride. It is also useful, however, for removing from a dispersion a substantial portion of the volatile organic material having a boiling point higher than water.

The present invention was conceived in order to satisfy a long-felt need for an industrially feasible method of substantially eliminating residual monomer from a vinylidene chloride polymer latex, but it is also suitable for treating other types of latices, and slurries as well.

DETAILED DESCRIPTION AND EMBODIMENTS

The process of the present invention is suitable for removing volatile organic material from aqueous dispersions of synthetic polymers obtained by known methods, e.g., by polymerizing monomeric materials in an aqueous emulsion, suspension, or microsuspension. In the case of polymer slurries, complete removal of volatile material cannot generally be achieved unless the slurry is subjected to the present process for longer periods of time and/or multiple exposures, since some of the volatile material, e.g., residual monomer, is inevitably trapped within the polymer particles and the diffusion of such material through those particles limits the rate of removal from the dispersion. In the case of polymer latices, however, the rate of removal appears to be limited only by diffusion through the aqueous phase, thereby permitting in most instances substantially complete and rapid removal of volatile material from such a dispersion in only a single exposure to the process of the present invention.

The volatile organic materials which can be removed from the polymer dispersions according to the process of the present invention include, but are not limited to, residual monomers such as vinyl chloride, vinylidene chloride, acrylonitrile, butadiene, acrylates, and styrene; organic solvents such as carbon tetrachloride, ethyl benzene, and the dichloroethylenes; and other non-monomeric impurities such as chain transfer compounds, decomposed catalysts, and the like. Those materials which have a boiling point lower than or equal to the boiling point of water, such as vinyl chloride and vinylidene chloride, are most completely and effectively removed from the dispersions according to the process of the present invention.

The present process is performed in a continuous manner by flowing a stream of an aqueous dispersion of a synthetic polymer into a zone having a vapor space above the liquid level of the stream, wherein the pressure within the zone is maintained at about the vapor pressure of water at the temperature of the stream. The manner in which this is done is not critical, so long as the depth of the stream as it enters the zone is maintained at a sufficiently shallow level so as to promote substantially complete and uniform boiling throughout while being subjected to the reduced pressures hereinabove described. It is essential that the dispersion not be subjected to the high shearing forces of nozzles and the like, since such forces could cause coagulation problems when the dispersion is in the form of a latex. Preferably, the present process is performed by flowing a shallow stream of the dispersion, e.g., a stream having a depth less than about one foot, and preferably less than about six inches, into an evacuated chamber, wherein the volatile organic materials and some of the water are vaporized and drawn from the top of the vessel by means of a suitable vacuum source, such as a conventional vacuum pump. The vapors drawn from the evacuated chamber are then cooled and condensed, or otherwise processed, so that the organic materials, e.g., monomers, may be recycled for use in a later polymerization reaction, or disposed of in an environmentally safe manner. Generally, the treated dispersion, having a substantially reduced content of volatile organic material, is then suitable for further processing or use according to processes known in the art. The size or shape of the vessel used to remove the volatile organic material from a dispersion does not appear to be critical. An example of a suitable vessel is a horizontally disposed tubular flash distillation chamber having a volume six times the volumetric feed rate per minute, and a length to diameter ratio of 6 to 1.

The temperature at which the dispersion is maintained while being treated is not critical, so long as it is not so high as will degrade or otherwise adversely affect the synthetic polymer contained in the dispersion. Generally, the temperature limits will be dictated by the particular polymer being treated. For example, a dispersion of particles of a vinylidene chloride polymer in latex form should preferably not be maintained at temperatures greater than about 60° C. Temperature limits for other dispersions are generally known by those skilled in the art, and will to some degree depend upon the length of time during which the polymer is exposed to such temperatures.

Generally, a lower processing temperature will require a greater reduction in pressure so as to approach the vapor pressure of water at the temperature selected. Consequently, the user must balance the equipment requirements for operating at the lower pressures and the energy requirements for operating at higher temperatures, and select the desired combination suitable for treating a particular polymer dispersion. If a relatively higher processing temperature is desired, i.e., a processing temperature which is greater than that of the dispersion before processing, the dispersion may be preheated before being passed into the reduced pressure treating zone. According to the process of the present invention, heating by mixing with high temperature steam is to be avoided for the reasons mentioned earlier. Consequently, it is preferred that the dispersion be preheated by passing it through a coiled or tubular heat exchanger in which the dispersion is heated to the final processing temperature, or, if desired, to a slightly higher temperature since some heat will inevitably be lost through the walls of the piping and apparatus used while processing the dispersion. Temperatures which will degrade the dispersed polymer, however, must be avoided. To avoid heat losses caused by transfer through the walls of the processing equipment, and, consequently, to maintain uniform processing conditions, it is advantageous to insulate the walls of such equipment.

The flow rate of the dispersion stream into the reduced pressure zone does not appear to be critical, so long as the depth of the stream as it enters the zone is sufficiently shallow to promote substantially uniform and complete boiling throughout at the selected operating temperature and pressure. Additionally, the residence time of the dispersion stream within the reduced pressure zone will not affect the amount of volatile organic material removed from the dispersion, so long as the diffusion of such material through the polymer particles is not controlling as described earlier, since volatilization occurs primarily at the inlet area of the reduced pressure zone. In many instances the volatile organic material can be substantially or completely removed from the dispersion in only a few seconds. This is especially true when the dispersion is in the form of a latex, and when the volatile organic material has a boiling point lower than or equal to that of water, e.g., vinyl chloride or vinylidene chloride.

The only limiting factor to be considered when using the process of the present invention appears to be the amount of foam generated by volatilizing the organic material within the dispersion. It is well known that when an aqueous synthetic polymer dispersion is subjected to boiling conditions, unacceptable foaming often occurs. Surprisingly, the amount of foam created by the continuous process of the present invention is considerably less, and consequently less troublesome, than that created by a conventional batch process for the removal of volatile organic material from an aqueous dispersion of synthetic polymers. If a dispersion stream is passed through a pipe before reaching the zone of reduced pressure, the shearing forces (which are not so great as to cause coagulation problems with a latex) created by the pipe walls tend to destabilize in some fashion any foam that is thereafter created when the dispersion is subjected to the reduced pressures described earlier. It appears that the size of the pipe for the flow rate selected has some impact on the destabilization of any foam that is created. Pipe sizes from ⅜ inch tubing to ½ inch Schedule 40 pipe were explored for flow rates ranging from 90 ml/min to 4 gal/min, and it appeared that the relatively smaller diameter pipes were more effective. If desired, an antifoaming agent may also be added to the dispersion to further reduce the amount of foam which is created. Suitable antifoaming agents, and methods for using them are known in the art. Other methods for breaking foams are known in the art, such as those described in U.S. Pat. No. 3,965,034.

The following specific example illustrates the invention but is not to be taken as limiting its scope. Parts and percentages are by weight unless otherwise indicated or required by context.

EXAMPLE 1

In this example, a vinylidene chloride polymer latex was treated according to the process of the present invention to remove residual monomers and non-monomeric volatile organic material. The latex, having a solids content of about 35 weight percent, was prepared by emulsion polymerizing vinyl and vinylidene chloride monomers to obtain copolymer particles comprising about 78 weight percent vinylidene chloride ($VeCl_2$) and 22 weight percent vinyl chloride (VCl). In most instances, rather than preparing a new latex for each test, a latex which had been stripped of volatile material in an earlier test was fortified with the subject monomers and dichloroethylene (DCE) so as to obtain latex samples having a sufficiently high concentration of volatile material to evaluate the effectiveness of the present invention. This was done by placing a quantity of the stripped latex into a reactor, adding the desired materials to the reactor under pressure, and heating the reactor to the desired processing temperature. After equilibrium was reached, as indicated by a stable pressure within the reactor, the reactor was vented to atmospheric pressure, and the latex was sampled to determine initial concentrations of volatile materials.

The major component used in the stripping process was a horizontally disposed glass pipe flash chamber, having a diameter of 4 inches and a length of 24 inches. Each end of the glass pipe was fitted with a stainless steel flange having several threaded openings which could be connected to piping or plugged as needed. The end flanges were machined and fastened to the glass pipe with a standard glass coupling. A variable-height standpipe drain was provided on the bottom-side of the chamber near one end. This pipe was constructed so that it could be screwed into the chamber to any desired height or removed completely, thereby controlling the liquid level in the chamber during processing.

At the same end of the flash chamber, piping was attached to the topmost area of the end flange, through which the volatilized organic material was withdrawn by means of a two-stage mechanical vacuum pump. Two traps cooled with solid carbon dioxide were placed in the line between the flash chamber and vacuum pump to condense the volatilized material.

In the earlier runs (Samples 1–4), the latex feed through ⅜ inch tubing into the end of the flash chamber opposite the drain was controlled by means of a plug valve. To improve feed rate control, a small peristaltic positive displacement pump coupled with a variable speed drive was used in later runs.

In some runs (Samples 9–12), a coil preheater was used in the latex feed line to bring the latex to the desired processing temperature. The preheater was made from about 11 feet of ⅜ inch tubing, wound into 12 coils having an outside diameter of 3.5 inches and an internal heat transfer surface of about 0.8 $ft^2$. This coil was submerged in a water bath maintained at the desired temperature for the latex feed.

Also, in some runs (Samples 9–13), the flash chamber was wrapped with a 700 watt heating tape, having a length of 10 feet. This heating tape was connected to a variable-ratio transformer, which could be adjusted to maintain a constant temperature in the flash chamber while processing the latex.

Based on the results of comparative batch processing experiments, wherein a vacuum was drawn on a shallow layer of latex at a rate limited by the volume of foam produced, i.e., the volume of foam was maintained at a constant level within a vacuum chamber while the pressure was being reduced over several minutes until the desired processing pressure was reached, it was expected that a latex could be continuously stripped at a feed rate of 80 ml/min (assuming a liquid residence time in the flash chamber of 2 minutes) without creating a greater amount of foam than that obtained in the batch process. Surprisingly, it was found that the feed rate could be increased to more than 10 times the expected rate without encountering any foaming difficulties. In most runs, the flash chamber contained no more than about 15–30 percent foam by volume. Only Sample 13, wherein the foam occupied about 70 percent of the flash chamber volume, showed any signs of flash chamber fouling caused by such foam. Since a continuous, coagulated film formed only on the upper, unwashed surface of the flash chamber in that Sample, it is believed that the fouling problem could be reduced or eliminated by cooling that upper surface, thereby condensing the vaporized material in that area and continuously washing the surface to prevent the formation of a film.

The results of these experiments, as shown in Table I, demonstrate the effectiveness of the process of present invention for removing residual monomers and other volatile, non-monomeric, organic material from an aqueous dispersion of synthetic polymers. Under the conditions of this Example, it was found that the removal of volatile material having a boiling point lower than that of water from a latex is independent of feed rate and residence time within the flash chamber, and depends primarily on temperature and pressure. Under optimum conditions, i.e., when a dispersion stream is maintained at a constant temperature, such as by insulating the walls of the feed piping and flash chamber, and also maintained at a depth which is sufficiently shallow to promote substantially uniform and complete boiling throughout the dispersion as it enters the reduced pressure zone, volatile organic material having a boiling point lower than or equal to that of water can be essentially eliminated in a single exposure to a pressure maintained at about the vapor pressure of water at the temperature of the stream, so long as diffusion of the volatile material through the polymer particles within the dispersion is not controlling, e.g., in an aqueous polymer latex. In those instances where diffusion through the polymer is controlling, e.g., in a dispersion containing larger-sized polymer particles, multiple or prolonged exposure may be necessary to completely remove volatile material. Additionally, in those instances where elimination of volatile material having a boiling point higher than that of water is desired, it may be necessary to continually replace volatilized water while multiply subjecting the dispersion to the process of the present invention.

What is claimed is:

1. A process for continuously removing residual monomer having a boiling point lower than or equal to that of water from a shear-sensitive synthetic polymer latex obtained from an emulsion polymerization reaction, which process consists essentially of flowing a stream of the latex once into a zone having a vapor space above the liquid level of the stream without subjecting the latex to shearing forces which cause coagulation of the polymer or to temperatures which cause degradation of the polymer, wherein the pressure within the zone is maintained at about the vapor pressure of water at the temperature of the stream and wherein the stream as it enters the zone is maintained at a depth sufficiently shallow to promote substantially uniform and complete boiling throughout, and thereafter removing the volatilized monomers and recovering the treated latex.

2. The process of claim 1 wherein the monomers are selected from the group consisting of vinyl chloride and vinylidene chloride.

3. The process of claim 2 wherein the depth of the stream is less than about one foot.

4. The process of claim 2 wherein the temperature of the stream is maintained within a range of about 30° C. to about 60° C.

TABLE I

| Sample | Feed Rate (ml/min) | Liquid Inventory (ml) | Latex Residence Time (min) | Adiabatic Flash Chamber | Pre-Heater Temp. (° C.) | Feed Temp (° C.) | Exit Temp. (° C.) | Vacuum (mm Hg abs) | Initial VCl (ppm) | Final VCl (ppm) | Initial VeCl$_2$ (ppm) | Final VeCl$_2$ (ppm) | Initial DCE(5) (ppm) | Final DCE (ppm) |
|---|---|---|---|---|---|---|---|---|---|---|---|---|---|---|
| 1 | 90[1] | 335 | 3.72 | No | (3) | 50 | 40 | 100 | 4776 | 603 | 31[2] | 14 | 243 | 113 |
| 2 | 185[1] | 335 | 1.81 | No | (3) | 50 | 35 | 50 | 4645 | 406 | 27[2] | 12.2 | 346 | 106 |
| 3 | 322[1] | 335 | 1.04 | No | (3) | 50 | 34 | 56 | 8140 | 350 | 592 | 118 | 235 | 56 |
| 4 | 144[1] | 335 | 2.33 | No | (3) | 50 | 24 | 20 | 7480 | 129 | 601 | 80 | 240 | 32 |
| 5 | 276 | 335 | 1.21 | No | (3) | 49 | 34 | 55 | 7914 | 229 | 2233 | 438 | 210 | 58 |
| 6 | 240 | 335 | 1.39 | No | (3) | 51 | 32 | 37 | 7914 | 202 | 2233 | 402 | 210 | 49 |
| 7 | 158 | 335 | 2.13 | No | (3) | 49 | 29 | 31 | 9285 | 235 | 1282 | 242 | 266 | 66 |
| 8 | 400 | 335 | 0.84 | No | (3) | 51 | 33 | 42 | 9285 | 471 | 1282 | 318 | 266 | 75 |
| 9 | 260 | 335 | 1.29 | Yes | 50 | 49 | 48 | 100 | 7000 | 325 | 2200 | 643 | 220 | 81 |
| 10 | 250 | 335 | 1.28 | Yes | 50 | 50 | 50 | 150 | 6095 | 724 | 1994 | 677 | 206 | 81 |
| 11 | 160 | (6) | (6) | Yes | 50 | 50 | (4) | 78 | 7300 | 168 | 1850 | 319 | 313 | 84 |
| 12 | 833 | 850 | 1.02 | Yes | 50 | 50 | 48 | 90 | 7200 | 302 | 2030 | 395 | 369 | 101 |
| 13 | 933 | (6) | (6) | Yes | (3) | 50 | (4) | 75 | 7275 | 87 | 2848 | 246 | 203 | 37 |

Notes:
[1] Feed rate erratic and vacuum hand controlled.
[2] No VeCl$_2$ or DCE added to feed in this Sample.
[3] None used.
[4] Not measured.
[5] Both cis- and trans-dichloroethylene.
[6] The standpipe was removed from the flash chamber drain in this run.